United States Patent [19]

Nakano

[11] Patent Number: 5,438,445
[45] Date of Patent: Aug. 1, 1995

[54] OPTICAL WAVELENGTH MULTIPLEXING COMMUNICATION SYSTEM

[75] Inventor: Yukio Nakano, Hachioji, Japan

[73] Assignee: Hitachi, Ltd., Tokyo, Japan

[21] Appl. No.: 783,778

[22] Filed: Oct. 29, 1991

[51] Int. Cl.[6] ............................................. H04J 14/02
[52] U.S. Cl. .................................... 359/124; 359/127; 359/179
[58] Field of Search ............... 359/123, 124, 127, 128, 359/129, 130, 174, 175, 176, 178, 179, 119, 125

[56] References Cited

U.S. PATENT DOCUMENTS

| | | | |
|---|---|---|---|
| 4,673,270 | 6/1987 | Gordon | 359/115 |
| 4,675,866 | 6/1987 | Takumi | 370/124 |
| 4,759,011 | 7/1988 | Hicks | 359/126 |
| 4,914,648 | 4/1990 | Acampora | 359/125 |
| 5,095,381 | 3/1992 | Karol | 359/123 |
| 5,101,290 | 3/1992 | Eng | 359/123 |

FOREIGN PATENT DOCUMENTS

| | | | |
|---|---|---|---|
| 0488241 | 6/1992 | European Pat. Off. | 359/124 |
| 0103552 | 8/1981 | Japan | 359/124 |
| 0012449 | 1/1983 | Japan | 359/119 |
| 0044832 | 3/1983 | Japan | 359/119 |
| 0090839 | 5/1983 | Japan | 359/119 |
| 0090840 | 5/1983 | Japan | 359/119 |
| 0272132 | 11/1988 | Japan | |
| 0123537 | 5/1989 | Japan | 359/119 |
| 0265339 | 10/1990 | Japan | 359/124 |
| 8704029 | 7/1987 | WIPO | 359/119 |

OTHER PUBLICATIONS

Suzuki et al, "A Photonic Wavelength–Division Switching System Using Tunable Laser Diode Filters", ICC '89, Jun. 1989 pp. 23.1.1–23.1.6.

*Primary Examiner*—Leslie Pascal
*Attorney, Agent, or Firm*—Antonelli, Terry, Stout & Kraus

[57] ABSTRACT

An optical wavelength multiplexing add/drop apparatus branches a received optical wavelength multiplex signal into a plurality of parts. Desired information to be received is selected from a plurality of signals multiplexed in a branch signal. Information to be transmitted is converted into an optical signal of an unused wavelength and the optical signal is transmitted after wavelength-multiplexing thereof with a plurality of signals multipelxed in another branch signal. Thereby, simultaneous transmission to a plurality of optical communication devices becomes possible. Also, an optical wavelength multiplexing cross-connection device is constructed with use of optical couplers having a small circuit scale, thereby realizing a small-sized cross-connection device.

15 Claims, 9 Drawing Sheets

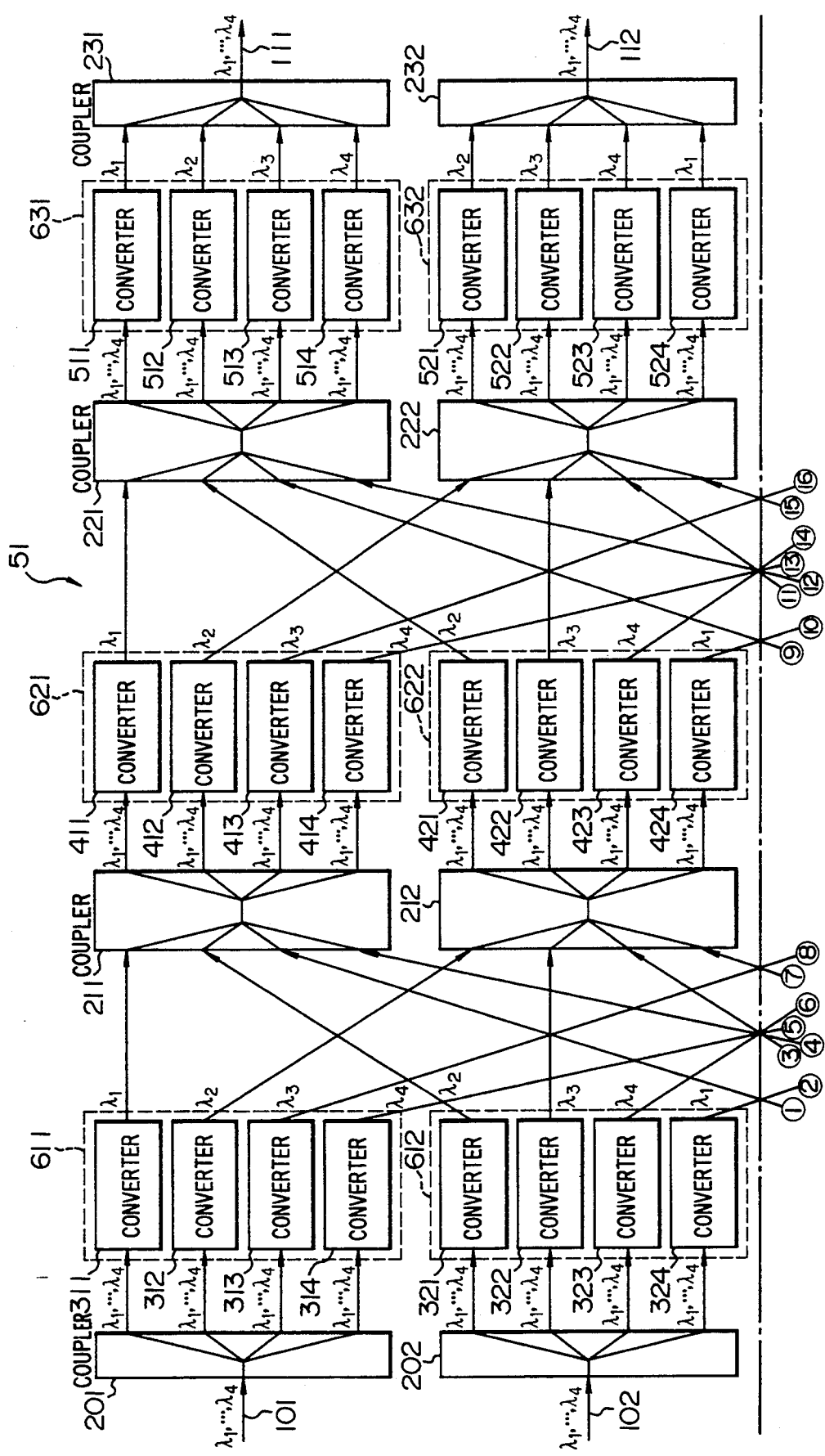

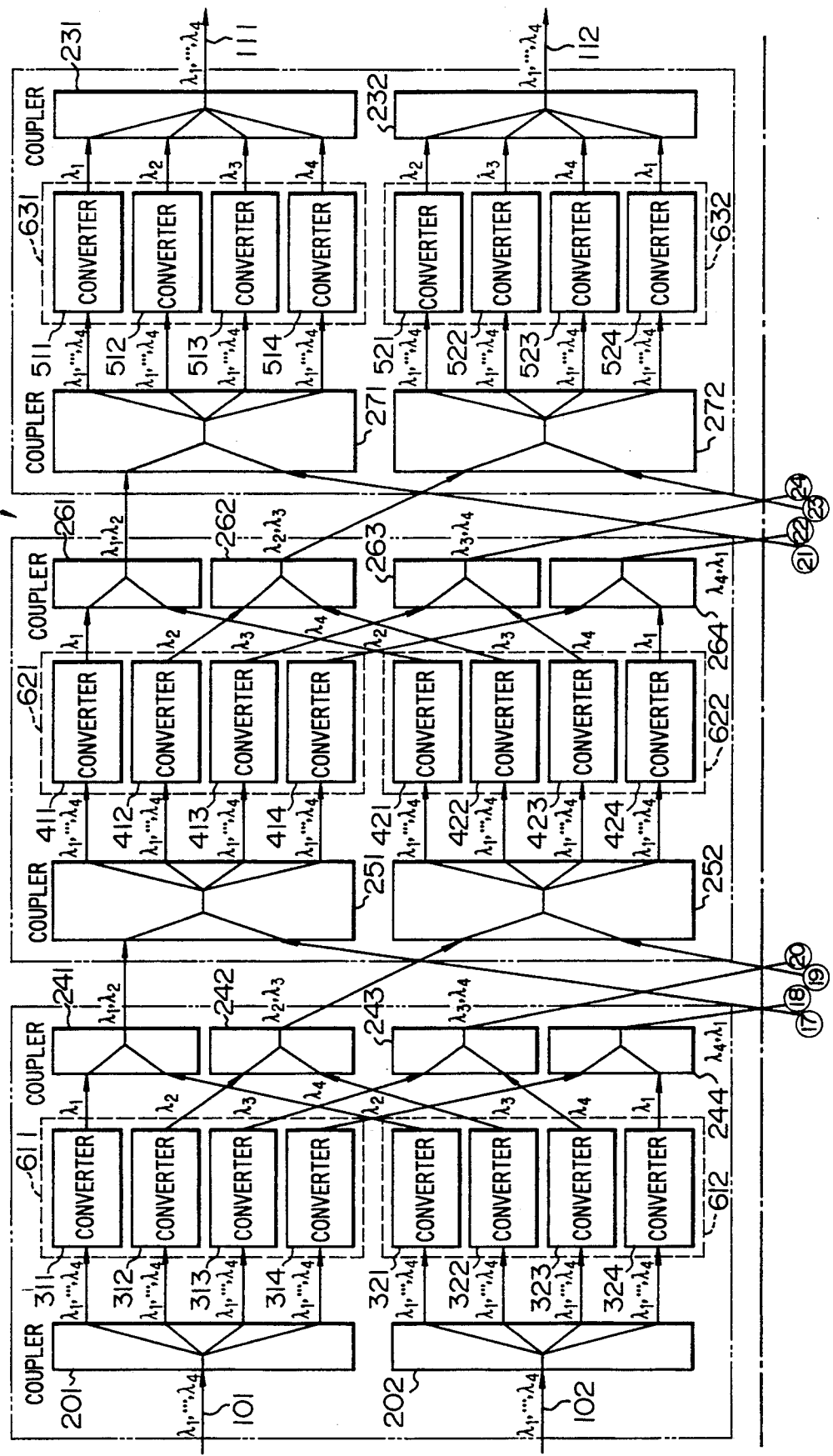

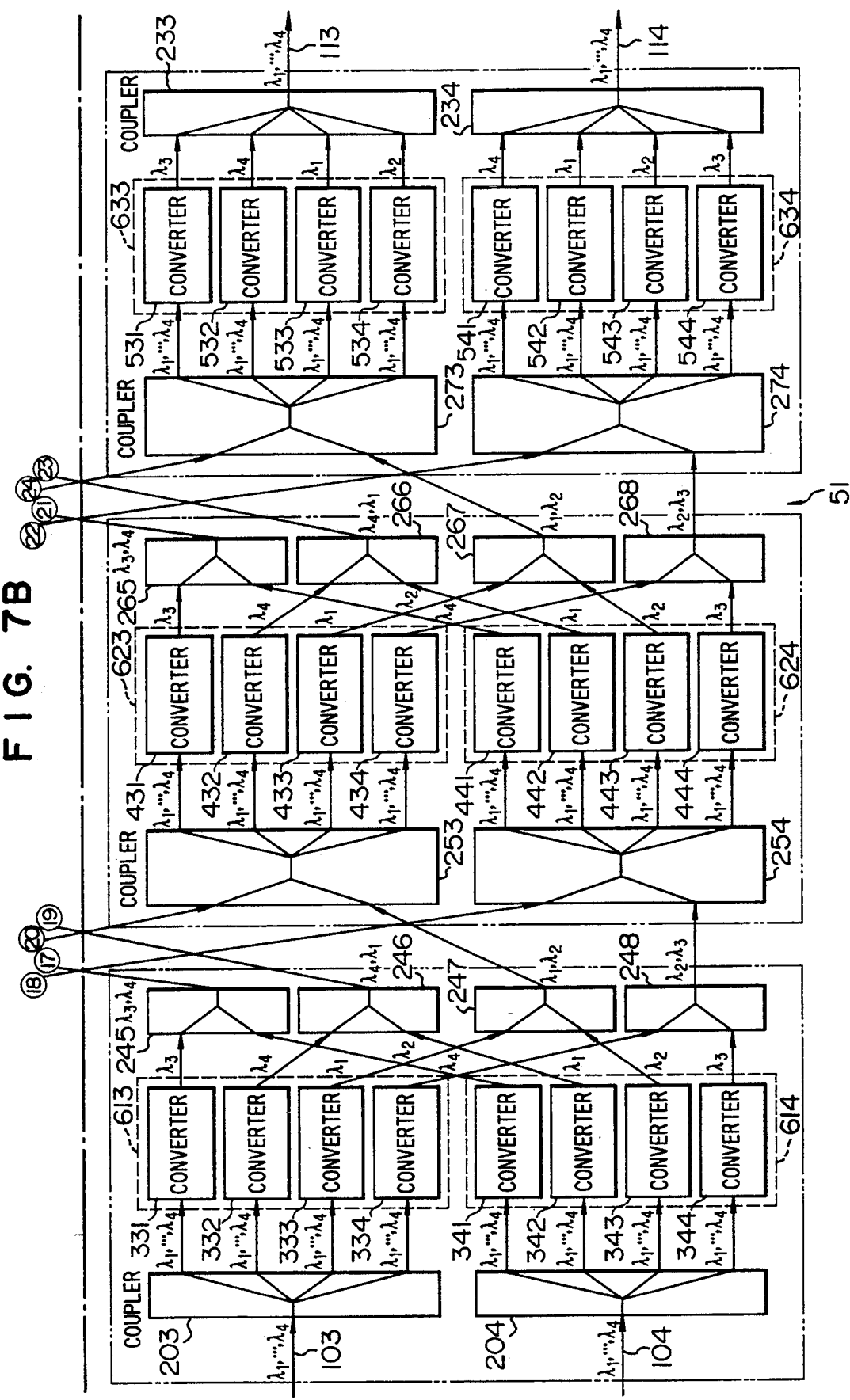

OPTICAL WAVELENGTH MULTIPLEXING COMMUNICATION SYSTEM

BACKGROUND OF THE INVENTION

The present invention relates to an optical wavelength multiplexing add/drop apparatus in which information to be received is separated from an optical wavelength multiplex signal including respective information allotted for a plurality of wavelengths and information to be transmitted in newly wavelength-multiplexed with such an optical wavelength multiplex signal, and further relates to an optical wavelength multiplexing communication system which includes an optical wavelength multiplexing network having a plurality of interconnected optical wavelength multiplexing add/drop apparatuses.

JP-A-63-272132 has disclosed an optical communication device in which information is separated from a wavelength multiplex signal and information is multiplexed with a wavelength multiplex signal. An example of the construction of such a conventional optical communication device is shown in FIG. 5. A wavelength multiplex input signal on an optical incoming line 81 is separated into optical signals of wavelengths $\lambda_1$ to $\lambda_{n-1}$ by an optical divider 82 and optical isolators 83. The optical signal of wavelength $\lambda_1$ is separated as a reception signal by an element for wavelength $\lambda_1$ in a wavelength converting element array 84. The remaining optical signals of wavelengths $\lambda_2$ to $\lambda_{n-1}$ are respectively wavelength-converted by the wavelength converting element array 84 into optical signals of wavelengths $\lambda_1$ to $\lambda_{n-2}$ as passing signals. Information to be transmitted from this optical communical device is carried by either one of the optical signals of wavelengths $\lambda_1$ to $\lambda_{n-1}$ is accordance with the position of an optical communication device to which that information is to be transmitted, and the information carrying signal is wavelength-multiplexed with the other passing signals by an optical multiplexer 85. The wavelength for the transmission signal is selected to be, for example, $\lambda_1$ if an optical communication device to which that signal is to be transmitted, is the next or 1st optical communication device and $\lambda_2$ if it is the 2nd optical communication device.

As a multi-stage optical switch circuit network for making a switching wavelength multiplex signals between a plurality of optical fibers, S. Suzuki et al "A Photonic Wavelength-Division Switching System using Tunable Laser Diode Filters" ICC'89, June 1989 has disclosed an optical switch circuit network in which wavelength converting switches are cascade-connected through wavelength separating circuits and wavelength multiplexing circuits. In the disclosed optical switch circuit network, wavelength converting switches for making a wavelength switching between wavelength multiplex signals to optical fibers are used as fundamental switches. At a first stage, a plurality of (or N) fundamental switches are provided in parallel and each of the outputs of the plurality of fundamental switches after wavelength conversion is separated into signals of discrete wavelengths by use of a wavelength separating circuit. Prior to the inputting of signals into the fundamental switches in a second stage, a combination of discrete output signal of different wavelengths from the respective fundamental switches in the first stage are collected with one wavelength being selected from each fundamental switch. These are multiplied by use of a wavelength multiplexing circuit to provide one wavelength multiplex signal. In parallel, another combination of discrete output signals of different wavelengths from the respective fundamental switches in the first stage are collected with another wavelength being selected from each fundamental switch and are multiplied by use of another wavelength multiplexing circuit to provide another wavelength multiplex signal. In this manner, the output signals in the first stage are multiplexed into N wavelength multiplex signals by use of N wavelength multiplexing circuits. These wavelength multiplex signals are wavelength-converted by N parallel-connected fundamental switches in the second stage, as in the first stage, and each of the outputs of the fundamental switches after wavelength conversion is separated into signals of discrete wavelengths by use of a wavelength separating circuit. Discrete output signals of different wavelengths from the respective fundamental switches in the second stage are multiplexed by N wavelength multiplexing circuits with different combinations each including one wavelength selected from each fundamental switch. These are thereafter wavelength-converted by fundamental switches in a third stage. A three-stage switch structure is formed by the above construction so that a large-scale switch is constructed by the combination of small-scale switches.

SUMMARY OF THE INVENTION

In the above-described conventional optical communication device, only one wavelength is separated as a reception information signal. Therefore, it is not possible to simultaneously receive information from a plurality of optical communication devices.

Accordingly, an object of the present invention is to provide an optical wavelength multiplexing add/drop apparatus which can simultaneously receive information from a plurality of optical communication devices and can simultaneously transmit information to a plurality of optical communication devices and to provide an optical wavelength multiplexing communication system including an optical wavelength multiplexing network which uses a plurality of such optical wavelength multiplexing add/drop apparatuses.

According to a first aspect of the embodiment, an optical wavelength multiplexing add/drop apparatus for separating information from and multiplexing new information with an optical wavelength multiplex signal including respective information allotted for a plurality of wavelengths comprises first means for selectively extracting an optical signal of arbitrary wavelength as a reception signal from the optical wavelength multiplex signal and transmitting at least the other optical signals included in the optical wavelength multiplex signal as a transmission signal, and second device for converting information to be transmitted into an optical signal and transmitting this optical signal as a transmission signal after wavelength-multiplexing thereof with the other optical signals by use of a wavelength different from the wavelengths included in the optical wavelength multiplex signal.

The first device may include a device for branching the optical wavelength multiplex signal and a wavelength-selective coherent demodulator.

The device for branching the optical wavelength multiplex signal may include an optical coupler.

The second device may include a variable-wavelength laser and an optical coupler.

According to a second aspect of the embodiment, an optical wavelength multiplexing network comprises N optical wavelength multiplexing add/drop apparatuses (N: a positive integer not smaller than 2) each of which includes first device for selectively extracting an optical signal of arbitrary wavelength as a reception signal from an optical wavelength multiplex signal and transmitting at least the other optical signals included in the optical wavelength multiplex signal as a transmission signal and second device for converting information to be transmitted into an optical signal and transmitting this optical signal as a transmission signal after wavelength-multiplexing thereof with the other optical signals by use of a wavelength different from wavelengths included in the optical wavelength multiplex signal, at least one but less than N wavelength converting device, and optical fibers for connecting the wavelength converting device and the optical wavelength multiplexing add/drop apparatuses.

According to a third aspect of the embodiment, an optical wavelength multiplexing network comprises N optical wavelength multiplexing add/drop apparatuses (N: a positive integer not smaller than 2) each of which includes first device for selectively extracting an optical signal of arbitrary wavelength as a reception signal from an optical wavelength multiplex signal and transmitting at least the other optical signals included in the optical wavelength multiplex signal as a transmission signal and second device for converting information to be transmitted into an optical signal and transmitting this optical signal as a transmission signal after wavelength-multiplexing thereof with the other optical signals by use of a wavelength different from wavelengths included in the optical wavelength multiplex signal, at least one but less than N optical wavelength multiplexing cross-connection device for making interconnection of optical wavelength multiplex signals, and optical fibers for connecting the optical wavelength multiplexing cross-connection device and the optical wavelength multiplexing add/drop apparatuses.

With the above construction, an optical wavelength multiplex signal is branched into at least two parts by an optical input signal branching device, for example, an optical coupler. One branch part is sent to a wavelength multiplexing transmission device and the other branch part is sent to a wavelength-selective coherent demodulator. In the wavelength-selective coherent demodulator, any desired wavelength is selected to demodulate a signal. In the case where the number of wavelengths to be received is two or more than that, the number of branch parts is selected to be three or more than that and two or more wavelength-selective coherent demodulators are provided for demodulating information of different wavelengths, respectively. Information to be transmitted is converted into an optical signal of a wavelength unused in the input signal by use of, for example, a variable-wavelength laser and is then sent to the wavelength multiplexing transmission device. The wavelength multiplexing transmission device wavelength-multiplexes the signal to be transmitted and the branch part of the input signal by use of, for example, an optical coupler and transmits the wavelength multiplex signal. In the case where the number of information to be transmitted is two or more than that, two or more variable-wavelength lasers are used for converting those information into optical signals of different wavelengths and wavelength-multiplexing these optical signals with the input signal.

In the optical wavelength multiplexing network including the N optical wavelength multiplexing add/drop apparatuses and at least one but less than N wavelength converting device connected by the optical fibers, each optical wavelength multiplexing add/drop apparatus selects any desired wavelength for signal demodulation and transmits transmission information after conversion thereof into an optical signal of a wavelength unused in an input signal. The wavelength converting device selects only optical signals of wavelengths for information to be relayed and transmits the selected optical signals after wavelength conversion thereof into the wavelengths of optical signals for information which need not to be relayed.

In the optical wavelength multiplexing network in which the N optical wavelength multiplexing add/drop apparatuses and at least one but less than N optical wavelength multiplexing cross-connection device for making interconnection of optical wavelength multiplex signals between a plurality of optical fibers are connected by use of optical fibers, the optical wavelength multiplexing cross-connection device transmits optical signals of wavelengths for information to be connected by the cross-connection device after wavelength conversion thereof into the wavelengths of optical signals for information which need not to be connected.

The optical wavelength multiplexing add/drop apparatus makes the reception of a plurality of wavelengths and the transmission of a plurality of wavelengths possible. Therefore, it is possible to simultaneously form channels for a plurality of optical communication devices.

In a wavelength multiplexing network including a plurality of cascade-connected wavelength converting switches, each of which converts a wavelength in an optical N-wavelength multiplex signal (N: a positive integer not smaller than 2) into any wavelength, the optical wavelength multiplexing cross-connection device uses optical couplers for making cascade connection between the wavelength converting switches.

More particularly, the wavelength multiplexing network or the optical wavelength multiplexing cross-connection device is constructed with an optical wavelength converting switch group in a first stage composed of N optical wavelength converting switches, each of which includes a first device for branching an optical N-wavelength multiplex signal into N parts and a second device for selecting any ones from among the N wavelengths multiplexed in each of the branch signals from the first device with one wavelength being selected for each branch signal and converting the selected wavelengths into different specified wavelengths, an optical wavelength converting switch group in each of second to L-th stages (L: a positive integer not smaller than 2) composed of N optical wavelength converting switches, each of which includes an optical coupler for receiving N output signals of different wavelengths from the N optical wavelength converting switches in the preceding stage with one output being selected for each optical wavelength converting switch and branching the sum of the received signals into N parts and a device for selecting any ones from among the N wavelengths multiplexed in each of the branch signals from the optical coupler with one wavelength being selected for each branch signal and converting the selected wavelengths into different specified wavelengths, and N devices each of which wavelength-multiplexes N outputs of different wavelengths from one of the optical wavelength converting switches in the L-th stage and outputs the wavelength multiplex signal.

With the above construction of the wavelength multiplexing network, an optical wavelength multiplex signal including N wavelengths multiplexed is branched into N parts which are in turn inputted to one of the N optical wavelength converting switches in the first stage. Each optical wavelength converting switch in the first stage selects any ones from among the N wavelengths multiplexed in each of the N branch signals with one wavelength being selected for each branch signal and outputs the selected wavelengths after conversion thereof into different specified wavelengths. A set of N output signals of different wavelengths from the N optical wavelength converting switches in the first stage are collected with one wavelength being selected for each optical wavelength converting switch and are inputted to one of optical couplers. Similarly, such other sets of N output signals of different wavelengths from the N optical wavelength converting switches in the first stage are respectively collected and are inputted to the other optical couplers. But, the same set of such output signals are not inputted to two or more optical couplers. Each optical coupler wavelength-multiplexes the inputted signals, branches the wavelength multiplex signal and inputs the branch signals to one of the optical wavelength converting switches in the second stage. Like the optical wavelength converting switch in the first stage, the optical wavelength converting switch in each of the second to L-th stages selects any ones from among N multiplexed wavelengths, converts the selected wavelengths into different specified wavelengths and connects the converted wavelengths to the switches in the succeeding stage through optical couplers. N outputs of different wavelengths from each optical wavelength converting switch in the L-th stage are multiplexed and delivered. Since the connection between the optical wavelength converting switches in the successive stages in thus made through the optical couplers, a small-sized circuit scale is realized.

BRIEF DESCRIPTION OF THE DRAWINGS

FIG. 6A is an upper part of a block diagram together with FIG. 6B showing an example of the construction of an optical wavelength multiplexing cross-connection device;

FIG. 7A is an upper part of a block diagram together with FIG. 7B showing another example of the construction of an optical wavelength multiplexing cross-connection device; and FIG. 7B is a lower part of a block diagram together with FIG. 7A showing another example of the construction of an optical wavelength multiplexing cross-connection device.

DESCRIPTION OF THE PREFERRED EMBODIMENTS

Figure 1:
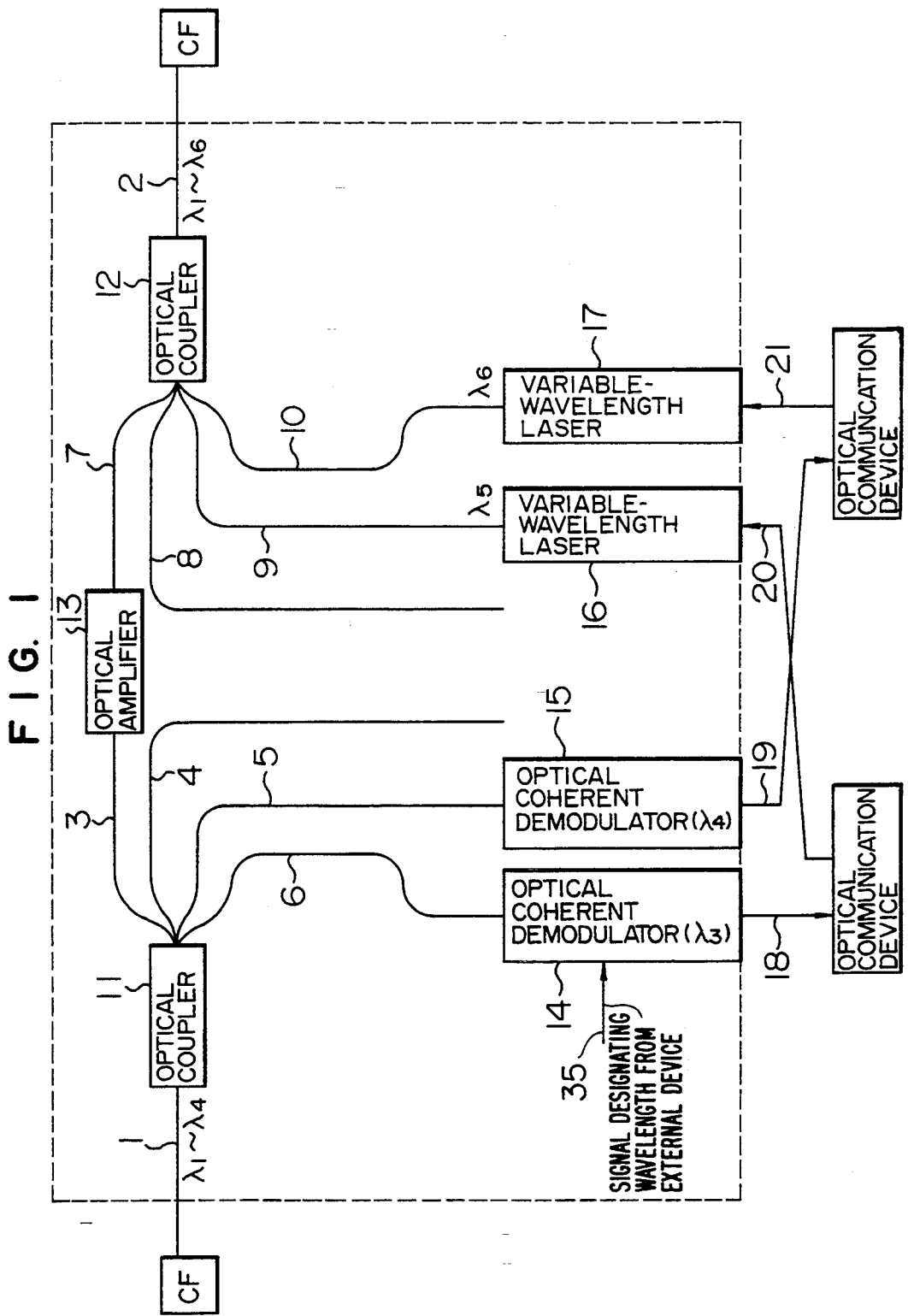
FIG. 1 is a block diagram showing the construction of an optical wavelength multiplexing add/drop apparatus according to a first embodiment of the present invention.

A first embodiment of the present invention will now be explained in reference to FIG. 1. FIG. 1 shows the construction of an optical wavelength multiplexing add/drop apparatus. The optical wavelength multiplexing add/drop apparatus includes optical fibers 1 to 10, an optical coupler for branching an optical input signal from the optical fiber 1 onto the optical fibers 3 to 6, an optical coupler 12 for multiplexing optical signals inputted from the optical fibers 7 to 10 to output the multiplex signal to the optical fiber 2, an optical amplifier 13 for amplifying an optical signal inputted from the optical fiber 3 to output the amplified signal to the optical fiber 7, an optical coherent demodulator 14 for receiving and optically coherent-demodulating an optical signal from the optical fiber 6, an optical coherent demodulator 15 for receiving and optically coherent-demodulating an optical signal from the optical fiber 5, and variable-wavelength lasers 16 and 17 for converting electric signals or transmission signals from signal lines 20 and 21 into optical signals and delivering the optical signals to the optical fibers 9 and 10.

In operation, an optical wavelength multiplex signal including optical signals multiplexed by use of four wavelengths $\lambda_1$ to $\lambda_4$ is inputted from the optical fiber 1 to the optical coupler 11. The optical coupler 11 branches the inputted optical signal onto the optical fibers 3 to 6. Namely, similar optical signals different in light intensity from the optical signal of the optical fiber 1 are supplied to the optical fibers 3 to 6, respectively. The optical coherent demodulator 14 selects and demodulates a signal of arbitrary wavelength, for example, $\lambda_3$ from the optical signals of wavelengths $\lambda_1$ to $\lambda_4$ inputted from the optical fiber 6 and outputs it as a reception signal to a signal line 18. The wavelength to be selected is designated by a signal 35 from an external device such as a microprocessor. Similarly, the optical coherent demodulator 15 selects and demodulates a signal of arbitrary wavelength, for example, $\lambda_4$ from the optical signals of $\lambda_1$ to $\lambda_4$ inputted from the optical fiber 5 and outputs it as a reception signal to a signal line 19. No demodulator is connected to the optical fiber 4. However, when the number of receiving channels required by the optical communication device is increased in future, another optical coherent demodulator is connected to the optical fiber 4. The variable-wavelength laser 16 converts a transmission signal from the signal line 20 into an optical signal of a wavelength other than the wavelengths $\lambda_1$ to $\lambda_4$ of the optical signals of the optical fiber 1, for example, a wavelength $\lambda_5$ and outputs it to the optical fiber 9. Similarly, the variable-wavelength laser 17 converts a transmission signal from the signal line 20 into an optical signal of a wavelength other than the wavelengths $\lambda_1$ to $\lambda_4$ of the optical signals of the optical fiber 1, for example, a wavelength $\lambda_6$ and outputs it to the optical fiber 10. When the number of transmitting channels required by the optical communication device is increased in future, another variable-wavelength laser is connected to the optical fiber 8. The optical amplifier 13 amplifies an optical signal inputted from the optical fiber 3 for compensation for the attenuation in intensity of the optical signal relayed by the optical wavelength multiplexing add/drop apparatus and outputs the amplified signal to the optical fiber 7. The optical signals inputted from the optical fibers 7 to 10 are multiplexed by the optical coupler 12 and are outputted to the optical fiber 2. In the case of the shown example, since the optical signals of wavelengths $\lambda_1$ to $\lambda_4$ from the optical fiber 7 and the optical signals of wavelengths $\lambda_5$ and $\lambda_6$ from the optical fibers 9 and 10 produced by conversion from the transmission signals from the optical wavelength multiplexing add/drop apparatus are inputted to the optical coupler 12, a wavelength multiplex signal including the wavelengths $\lambda_1$ to $\lambda_6$ is outputted to the optical fiber 2. In this manner, wavelengths $\lambda_5$ and $\lambda_6$, which are not used in the input signal, are used for the transmission signals and an optical communication device connected to the optical fiber 2 can simultaneously receive information from an optical communication device connected to the optical fiber 1 and the optical communication devices connected to the signal lines 18, 19, 20 and 21.

Figure 2:
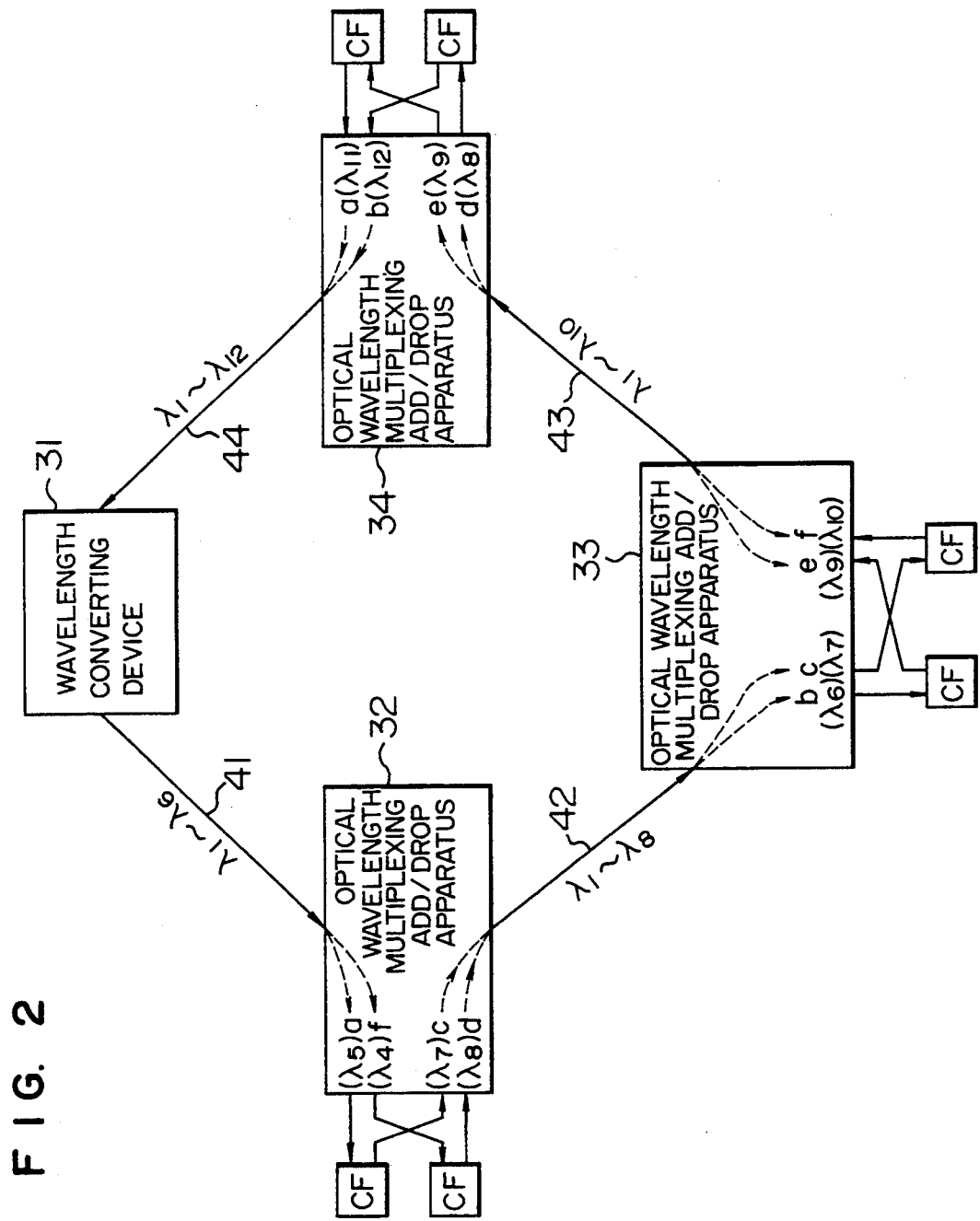
FIG. 2 is a block diagram showing the construction of an optical wavelength multiplexing network according to a second embodiment of the present invention.
Figure 3:
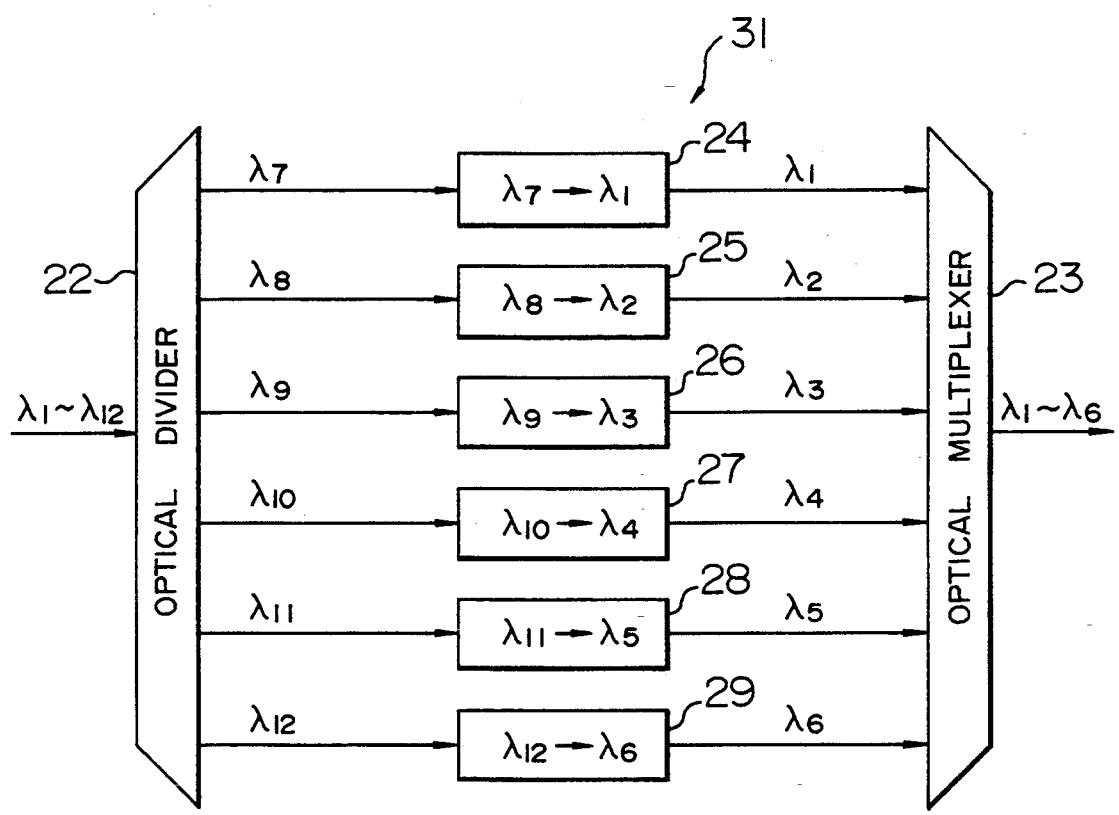
FIG. 3 is a block diagram showing the construction of a wavelength converting device used in the second embodiment of the present invention.

Next, a second embodiment of the present invention will be explained in reference to FIG. 2. FIG. 2 shows a ring network in which optical wavelength multiplexing add/drop apparatuses as described in combination with the first embodiment are applied. The ring network includes optical wavelength multiplexing apparatuses 32 to 34, a wavelength converting device 31 and optical fibers 41 to 44. Each of the optical wavelength multiplexing add/drop apparatuses 32 to 34 has a construction similar to that described in conjunction with the first embodiment but wavelengths used in any one of the apparatuses 32 to 34 are different from those used in the other apparatuses. The construction of the wavelength converting device 31 is shown in FIG. 3. As shown in FIG. 3, the wavelength converting device 31 includes an optical divider 22, an optical multiplexer 23 and optical wavelength converters 24 to 29.

The operation of the second embodiment will now be explained. In the network shown in FIG. 2, information is transmitted in only a counter-clockwise direction. The formation of channels is made by allotting a specific wavelength to each one-way channel between the optical wavelength multiplexing add/drop apparatuses. As for a channel which is not passed through the wavelength converting device 31, a wavelength to be transmitted and a wavelength to be received are equal to each other and the wavelength is selected from a range of $\lambda_7$ to $\lambda_{12}$. For example, $\lambda_7$, $\lambda_8$ and $\lambda_9$ are allotted to a channel c from the optical wavelength multiplexing add/drop apparatus 32 to the optical wavelength multiplexing add/drop apparatus 33, a channel d from the apparatus 32 to the apparatus 34 and a channel e from the apparatus 33 to the apparatus 34, respectively. On the other hand, as for a channel passed through the wavelength converting device 31, a transmission wavelength on the transmitting optical wavelength multiplexing add/drop apparatus side is selected from a range of $\lambda_7$ to $\lambda_{12}$ and a reception wavelength on the receiving optical wavelength multiplexing add/drop apparatus is selected from a range of $\lambda_1$ to $\lambda_6$. In this case, a relationship between transmission and reception wavelengths as selected is uniquely fixed and is selected from the combinations of (transmission wavelength, reception wavelength): $(\lambda_7, \lambda_1)$; $(\lambda_8, \lambda_2)$; $(\lambda_9, \lambda_3)$; $(\lambda_{10}, \lambda_4)$; $(\lambda_{11}, \lambda_5)$; and $(\lambda_{12}, \lambda_6)$. For example, a channel a from the optical wavelength multiplexing add/drop apparatus 34 to the optical wavelength multiplexing add/drop apparatus 32 is allotted with $\lambda_{11}$ for a transmission wavelength and $\lambda_5$ for a reception wavelength. In the wavelength converting device 31, a wavelength multiplex optical signal inclusive of wavelengths $\lambda_1$ to $\lambda_{12}$ from the optical fiber 44 is inputted to the optical divider 22, as shown in FIG. 3. In the optical divider 22, only optical signals of wavelengths $\lambda_7$ to $\lambda_{12}$ are divisionally selected from the optical signals of wavelengths $\lambda_1$ to $\lambda_{12}$ included in the wavelength multiplex input signal. The optical wavelength converters 24 convert the selected optical signals of wavelengths $\lambda_7$ to $\lambda_{12}$ into optical signals of wavelengths $\lambda_1$ to $\lambda_6$, respectively. This rule of conversion is independent from the allottment of wavelengths to channels or always fixed. The optical multiplexer 23 multiplies the optical output signals from the optical wavelength converters 24 to 29 and delivers the multiplex signal as an optical wavelength multiplex signal inclusive of wavelengths $\lambda_1$ to $\lambda_6$ to the optical fiber 41 (see FIG. 2). Through the above operation of the wavelength converting device 31, there are removed those optical signals of wavelengths $\lambda_1$ to $\lambda_6$ among the optical signals of wavelengths $\lambda_1$ to $\lambda_{12}$ from the optical fiber 44 which are useless since they have already been received by the preceding optical wavelength multiplexing add/drop apparatuses prior to arrival thereof to the wavelength converting device 31, and the optical signals of wavelengths $\lambda_7$ to $\lambda_{12}$ as signals to be relayed to the lower stream side of the wavelength converting device 31 are converted into optical signals of $\lambda_1$ to $\lambda_6$, respectively. The operation of each of the optical wavelength multiplexing add/drop apparatuses 32 to 34 is similar to that described in conjunction with the first embodiment. Namely, each apparatus optionally coherent-demodulates an optical signal of a wavelength to be received while converting a signal to be transmitted into an optical signal of an unused wavelength and transmitting the optical signal in a wavelength-multiplexed with the received optical wavelength multiplex signal. In the second embodiment, a wavelength to be transmitted is selected from among $\lambda_7$ to $\lambda_{12}$.

Figure 4:
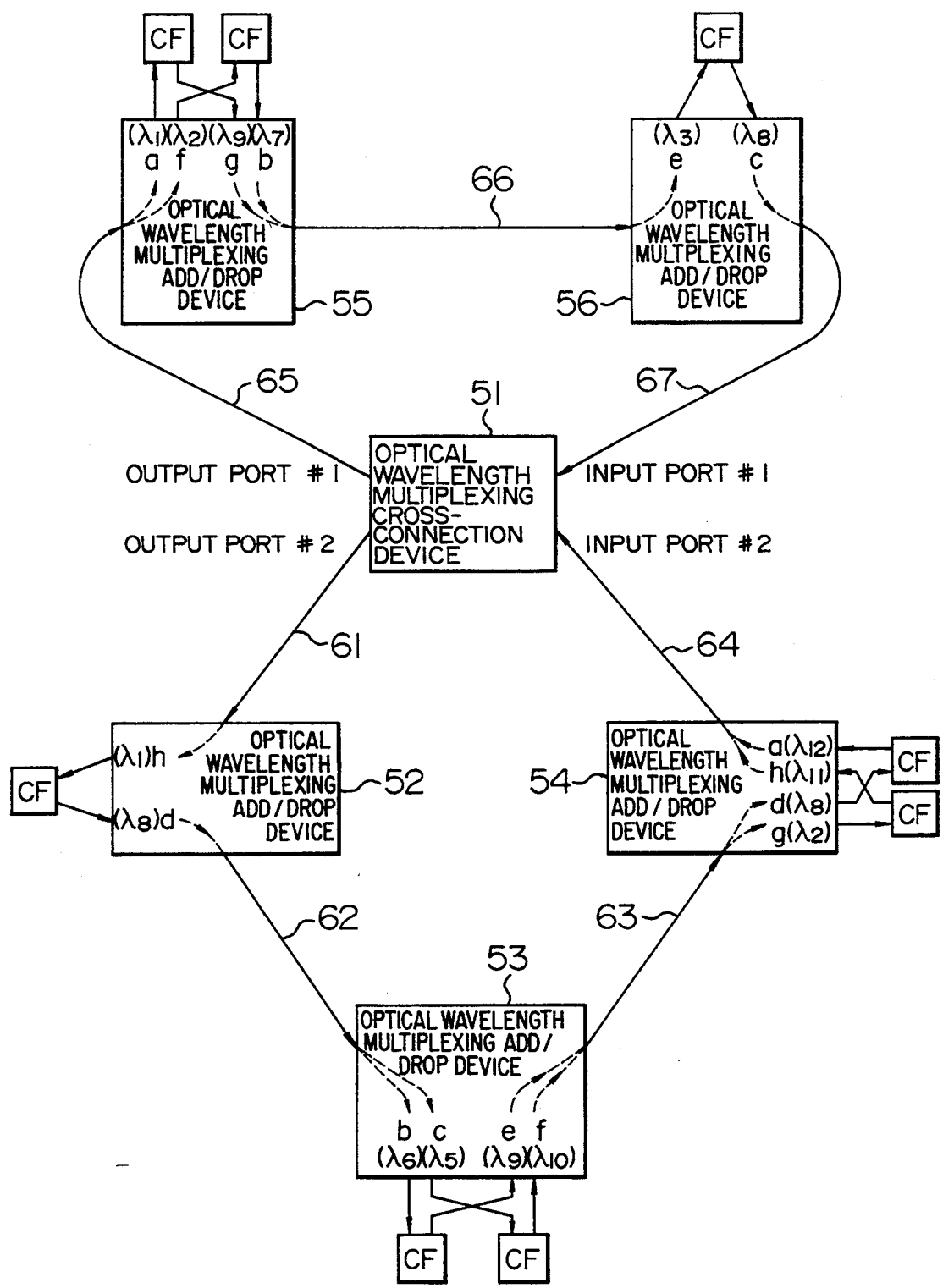
FIG. 4 is a block diagram showing the construction of an optical wavelength multiplexing network according to a third embodiment of the present invention.
Figure 5:
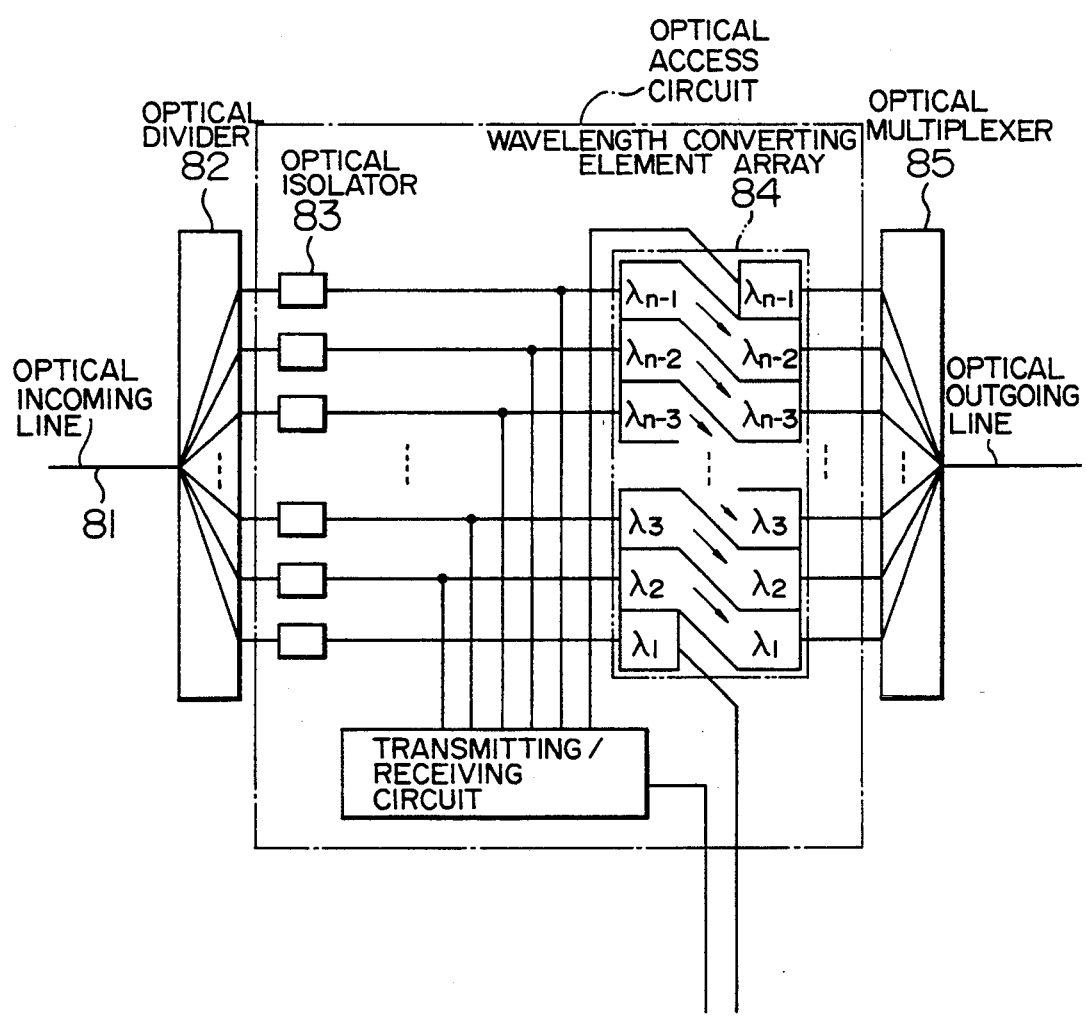
FIG. 5 is a block diagram showing the construction of the conventional optical communication device.

Next, a third embodiment of the present invention will be explained in reference to FIG. 4. FIG. 4 shows a network using optical wavelength multiplexing add/drop apparatuses described in conjunction with the first embodiment. The network includes optical wavelength multiplexing add/drop apparatuses 52 to 56 and an optical wavelength multiplexing cross-connection device 51. The construction of each of the optical wavelength multiplexing add/drop apparatuses 52 to 56 is similar to that described in conjunction with the first embodiment but wavelengths used in any one of the apparatuses 52 to 56 are different from those used in the other apparatuses. The construction of the optical wavelength multiplexing cross-connection device 51 will be mentioned later on. The optical wavelength multiplexing add/drop apparatuses 52 to 54 and the optical wavelength multiplexing cross-connection device 51 form a first ring. The optical wavelength multiplexing add/drop apparatuses 55 and 56 and the optical wavelength multiplexing cross-connection device 51 form a second ring. The first and second rings are connected by the optical wavelength multiplexing cross-connection device 51.

The operation of the third embodiment will now be explained. The formation of channels is made by allotting a specific wavelength to each one-way channel between the optical wavelength multiplexing add/drop apparatuses, as in the second embodiment. As for a channel which is not passed through the optical wavelength multiplexing cross-connection device 51, a transmission wavelength and a reception wavelength are equal to each other and the wavelength is selected from a range of $\lambda_7$ to $\lambda_{12}$. On the other hand, as for a channel passed through the optical wavelength multiplexing cross-connection device 51, a transmission wavelength is selected from a range of $\lambda_7$ to $\lambda_{12}$ and a reception wavelength is selected from a range of $\lambda_1$ to $\lambda_6$. In this case, a relationship between transmission and reception wavelengths is not uniquely fixed or is freely selected. By the optical wavelength multiplexing cross-connection device 51, there are removed those optical signals of wavelengths $\lambda_1$ to $\lambda_6$ among optical signals of wavelengths $\lambda_1$ to $\lambda_{12}$ from optical fibers 64 and 67 which are useless since they have already been received prior to arrival thereof to the optical wavelength multiplexing cross-connection device 51, and optical signals of wavelengths $\lambda_7$ to $\lambda_{12}$ as signals to be relayed to the lower stream side of the optical wavelength multiplexing cross-connection device 51 are converted into optical signals of wavelengths $\lambda_1$ to $\lambda_6$ and are delivered to an optical fiber 65 or an optical fiber 61. A relationship between a wavelength before conversion and a wavelength after conversion and an optical fiber to which the optical signals of wavelengths $\lambda_1$ to $\lambda_6$ are delivered, are determined upon connection of a channel. For example, when a channel a is to be connected from the optical wavelength multiplexing add/drop apparatus 54 to the optical wavelength multiplexing add/drop device 55, an optical signal of wavelength $\lambda_{12}$ is transmitted from the optical wavelength multiplexing add/drop apparatus 54, is converted by the optical wavelength multiplexing cross-connection device 51 into an optical signal of wavelength $\lambda_1$ and is then connected to the optical fiber 65. In the optical wavelength multiplexing add/drop device 55, the optical signal of wavelength $\lambda_1$ is selected and coherent-demodulated.

Figure 6B:
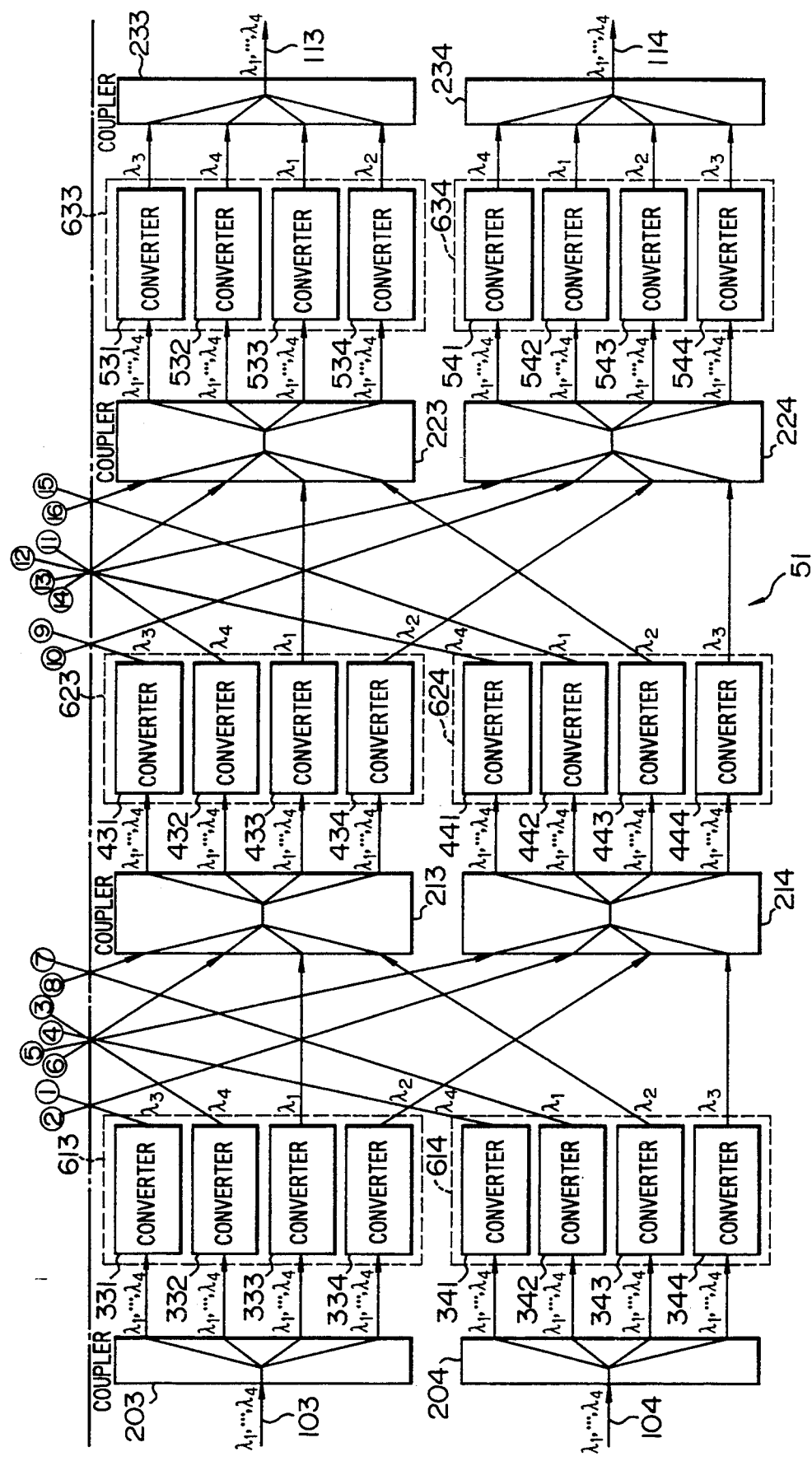
FIG. 6B is a lower part of a block diagram together with FIG. 6A showing an example of the construction of an optical wavelength multiplexing cross-connection device.

An example of the construction of the optical wavelength multiplexing cross-connection device 51 is shown in FIG. 6A and FIG. 6B. FIGS. 6A and 6B show four-wavelength multiplexing by way of example. N-wavelength multiplexing will be realized easily from the following explanation. The optical wavelength multiplexing cross-connection device 51 shown in FIGS. 6A and 6B comprises fundamental optical wavelength converting switches 611 to 614 in a first stage which include optical couplers 201 to 204 provided for optical fibers 101 to 104, respectively, each optical coupler branching a four-wavelength ($\lambda_1$ to $\lambda_4$) multiplex signal from the corresponding optical fiber into four parts, and four sets of optical wavelength converters 311 to 314, 321 to 324, 331 to 334 and 341 to 344 provided for the optical couplers 201 to 204, respectively, each of the optical wavelength converters in each set selecting any one from among the four wavelengths $\lambda_1$ to $\lambda_4$ multiplexed in each branch output of the corresponding optical coupler and converting the selected wavelength into one of wavelengths $\lambda_1$ to $\lambda_4$ so that the optical wavelength converters in that set respectively provide wavelengths $\lambda_1$ to $\lambda_4$ after conversion; fundamental optical wavelength converting switches 621 to 624 in a second stage which include an optical coupler 211 for receiving the output signals of wavelengths $\lambda_x$ (x=1 to 4) from the fundamental optical wavelength converting switches 61x in the first stage and branching the sum of the received signals into four parts, an optical coupler 212 for receiving the output signals of wavelengths $\lambda_{x+1}$ (x=1 to 4) from the fundamental optical wavelength converting switches 61x and branching the sum of the received signals into four parts, an optical coupler 213 for receiving the output signals of wavelengths $\lambda_{x+2}$ (x=1 to 4) from the fundamental optical wavelength converting switches 61x and branching the sum of the received signals into four parts, an optical coupler 214 for receiving the output signals of wavelengths $\lambda_{x+3}$ (x=1 to 4) from the fundamental optical wavelength converting switches 61x and branching the sum of the received signals into four parts, and four sets of optical wavelength converters 411 to 414, 421 to 424, 431 to 434 and 441 to 444 provided for the optical couplers 211 to 214, respectively, each of the optical wavelength converters in each set selecting any one from among the four wavelengths $\lambda_1$ to $\lambda_4$ multiplexed in each branch output of the corresponding optical coupler and converting the selected wavelength into one of wavelengths $\lambda_1$ to $\lambda_4$ so that the optical wavelength converters in that set respectively provide wavelengths $\lambda_1$ to $\lambda_4$ after conversion; fundamental optical wavelength converting switches 631 to 634 in a third stage which include optical couplers 22i (i=1 to 4) for each receiving the output signals of wavelengths $\lambda_{x+i-1}$ from the fundamental optical wavelength converting switches 62x (x=1 to 4) in the second stage and branching the sum of the received signals into four parts and four sets of optical wavelength converters 511 to 514, 521 to 524, 531 to 534 and 541 to 544 provided for the optical couplers 221 to 224, respectively, each of the optical wavelength converters in each set selecting any one from among the four wavelengths $\lambda_1$ to $\lambda_4$ multiplexed in each branch output of the corresponding optical coupler and converting the selected wavelength into one of wavelengths $\lambda_1$ to $\lambda_4$ so that the optical wavelength converts in that set respectively provide wavelengths $\lambda_1$ to $\lambda_4$ after conversion; and optical couplers 231 to 234 provided for the sets of optical wavelength converters 511 to 514, 521 to 524, 531 to 534 and 541 to 544, respectively, each optical coupler 23j (j=1 to 4) wavelength-multiplexing the outputs of the corresponding optical wavelength converters 5j1 to 5j4 to output the wavelength multiplex signal to an optical fiber 11j.

The operation of the optical wavelength multiplexing cross-connection device shown in FIGS. 6A and 6B will now be explained. In the optical fiber 101, four signals are wavelength-multiplexed using four wavelengths of $\lambda_1$ to $\lambda_4$. The optical coupler 201 branches the wavelength multiplex signal from the optical fiber 101 into four parts which are in turn supplied to the optical wavelength converters 311 to 314. Similarly, the optical coupler 202, 203 or 204 branches the wavelength multiplex signal from the optical fiber 102, 103 or 104 into four parts which are in turn supplied to the optical wavelength converters 321 to 324, 331 to 334 or 341 to 344. In the optical wavelength converter 311, any one is selected from among the four multiplexed wavelengths under an external control and is converted into a waveform of $\lambda_1$. An output of the optical wavelength converter 311 includes a signal of wavelength $\lambda_1$. Also, in the optical wavelength converter 312, 313 or 314, any one is selected from among the four multiplexed wavelengths under an external control and is converted into a wavelength of $\lambda_2$, $\lambda_3$ or $\lambda_4$. Similarly, in the optical wavelength converter 321, 322, 323 or 324, any one is selected from among the four multiplexed wavelengths under an external control and is converted into a wavelength of $\lambda_2$, $\lambda_3$, $\lambda_4$ or $\lambda_1$. In the optical wavelength converter 331, 332, 333 or 334, any one is selected from among the four multiplexed wavelengths and is converted into a wavelength of $\lambda_3$, $\lambda_4$, $\lambda_1$ or $\lambda_2$. In the optical wavelength converter 341, 342, 343 or 344, any one is selected from among the four multiplexed wavelengths and is converted into a wavelength of $\lambda_4$, $\lambda_1$, $\lambda_2$ and $\lambda_3$. The optical wavelength converters 311 to 314, 321 to 324, 331 to 334 and 341 to 344 take charge of a first-stage switching function of the three-stage switching. The output of the optical wavelength converter 311 (wavelength $\lambda_1$), the output of the optical wavelength converter 321 (wavelength $\lambda_2$), the output of the optical wavelength converter 331 (wavelength $\lambda_3$) and the output of the optical wavelength converter 341 (wavelength $\lambda_4$) are inputted to the optical coupler 211 and multiplexed therein, and the wavelength multiplex signal is thereafter branched into four parts which are in turn supplied to the optical wavelength converters 411 to 414. Similarly, the output of the optical wavelength converter 312 (wavelength $\lambda_2$), the output of the optical wavelength converter 322 (wavelength $\lambda_3$), the output of the optical wavelength converter 332 (wavelength $\lambda_4$) and the output of the optical wavelength converter 342 (wavelength $\lambda_1$) are inputted to the optical coupler 212 and multiplexed therein, and the wavelength multiplex signal is thereafter branched into four parts which are in turn supplied to the optical wavelength converters 421 to 424. Also, the output of the optical wavelength converter 313 (wavelength $\lambda_3$), the output of the optical wavelength converter 323 (wavelength $\lambda_4$), the output of the optical wavelength converter 333 (wavelength $\lambda_1$) and the output of the optical wavelength converter 343 (wavelength A2) are inputted to the optical coupler 213 and multiplexed therein, and the wavelength multiplex signal is thereafter branched into four parts which are in turn supplied to the optical wavelength converters 431 to 434. Furthermore, the output of the optical wavelength converter 314 (wavelength $\lambda_4$), the output of the optical wavelength converter 324 (wavelength $\lambda_1$), the output of the optical wavelength converter 334 (wavelength $\lambda_2$) and the output of the optical wavelength converter 344 (wavelength $\lambda_3$) are inputted to the optical coupler 214 and multiplexed therein, and the wavelength multiplex signal is thereafter branched into four parts which are in turn supplied to the optical wavelength converters 441 to 444. The optical couplers 211 to 214 take charge of a function of connecting the switches in the first stage and the switches in the second stage. The operation of the optical wavelength converters 411 to 414, 421 to 424, 431 to 434 and 441 to 444 forming the second-stage switches and the operation of the optical wavelength converters 511 to 514, 521 to 524, 531 to 534 and 541 to 544 forming the third-stage switches are substantially the same as the operation of the optical wavelength converters 311 to 314, 321 to 324, 331 to 334 and 341 to 344 forming the first-stage switches. Also, the operation of the optical couplers 221 to 224 taking charge of a function of connecting the second-stage switches and the third-stage switches is substantially the same as that of the optical couplers 211 to 214 taking charge of the function of connecting the first-stage switches and the second-stage switches. The outputs of the optical wavelength converters 511 to 514 are multiplexed by the optical coupler 231 and the wavelength multiplex signal is outputted to the optical fiber 111. Similarly, the outputs of the optical wavelength converters 521 to 524 are multiplexed by the optical coupler 232 and the wavelength multiplex signal is outputted to the optical fiber 112. Also, the outputs of the optical waveform converters 531 to 534 are multiplexed by the optical coupler 233 and the wavelength multiplex signal is outputted to the optical fiber 113. Further, the outputs of the optical wavelength converters 541 to 544 are multiplexed by the optical coupler 234 and the wavelength multiplex signal is outputted to the optical fiber 114.

FIG. 7A and FIG. 7B show another example of the construction of the optical wavelength multiplexing cross-connection device. The optical wavelength multiplexing cross-connection device shown in FIGS. 7A and 7B includes optical couplers 201 to 204 and 231 to 234 having the same construction as those shown in FIGS. 6A and 6B, fundamental optical wavelength converting switches 611 to 614, 621 to 624 and 631 to 634 having the same construction as those shown in FIGS. 6A and 6B, and optical couplers 241 to 248,251 to 254, 261 to 268 and 271 to 274 for connection between switch stages.

The operation of the optical wavelength multiplexing cross-connection device shown in FIGS. 7A and 7B will now be explained. The operation of the optical couplers 201 to 204 and 231 to 234 and the fundamental optical wavelength converting switches 611 to 614, 621 to 624 and 631 to 634 are substantially the same as the operation of those shown in FIGS. 6A and 6B. The optical coupler 241 receives an output of the optical wavelength converter 311 (wavelength $\lambda_1$) and an output of the optical wavelength converter 321 (wavelength $\lambda_2$) to multiplex them and supplies the wavelength multiplex signal to the optical coupler 251. Similarly, each of the optical couplers 242 to 248 receives two of outputs of the optical wavelength converters 311 to 314,321 to 324, 331 to 334 and 341 to 344 (having two different fixed wavelengths) to multiplex them and supplies the wavelength multiplex signal to one of the optical couplers 251 to 254. The optical coupler 251 receives an output of the optical coupler 241 (wavelength $\lambda_1$ plus wavelength $\lambda_2$) and an output of the optical coupler 245 (wavelength $\lambda_3$ plus wavelength $\lambda_4$) to multiplex them and supplies the wavelength multiplex signal to the optical wavelength converters 411 to 414. Similarly, the optical coupler 252, 253 or 254 receives two of outputs of the optical couplers 242 to 248 (each containing two wavelengths multiplexed) to multiplex them and supplies the wavelength multiplex signal to the optical wavelength converters 421 to 424, 431 to 443 or 441 to 444. The operation of the optical couplers 261 to 268 and 271 to 274 is substantially the same as that of the optical couplers 241 to 248 and 251 to 254.

In the example shown in FIGS. 7A and 7B, in the case where the switches in the successive stages are positioned away from each other, the optical couplers 241 to 248 are located near the first-stage switches and the optical couplers 251 to 254 are located near the second-stage switches. Also, the optical couplers 261 to 268 and located near the second-stage switches and the optical couplers 271 to 274 are located near the third-stage switches. Thereby, the number of transmission lines (or fibers) required between successive stages can be reduced as compared with that in the example shown in FIGS. 6A and 6B.

As mentioned above, in the present invention, a received signal is branched to select desired information to be received and information to be transmitted is transmitted after conversion thereof into an optical signal of an unused wavelength and wavelength-multiplexing of the converted signal with the received signal. Therefore, simultaneous transmission to a plurality of optical communication devices can be achieved easily in such a manner that a device for selecting information to be received and a device for converting information to be transmitted into an optical signal are increased in number in accordance with the number of channels required. Also, since an optical wavelength multiplexing cross-connection device is provided constructed by use of optical couplers which have generally a small circuit scale, it is possible to realize a small-scaled optical wavelength multiplexing cross-connection device.

I claim:

1. An optical wavelength multiplexing add/drop apparatus for separating an optical signal from, and multiplexing a new optical signal with, an optical wavelength multiplex signal including a respective circuit signal allotted for a plurality of wavelengths, comprising:
first means for selectively extracting a first optical signal, having a wavelength selected in response to a signal designating a particular wavelength, from received optical wavelength multiplex signals; and
second means for converting said circuit signal to be transmitted into second optical signal by use of a wavelength different from the wavelengths included in said received optical wavelength multiplex signals and transmitting said second optical signal after wavelength-multiplexing thereof with said received optical wavelength multiplex signals.

2. An optical wavelength multiplexing add/drop apparatus according to claim 1, wherein said first means includes means for branching said optical wavelength multiplex signals and a wavelength-selective coherent demodulator.

3. An optical wavelength multiplexing add/drop apparatus according to claim 2, wherein said branching means includes an optical coupler.

4. An optical wavelength multiplexing add/drop apparatus according to claim 1, wherein said second means includes a variable-wavelength laser and an optical coupler.

5. An optical wavelength multiplexing network including plural network node apparatuses which are connected to each other by optical fibers, comprising:
N optical wavelength multiplexing add/drop apparatuses, where N is a positive integer not smaller than 2, each of which includes first means for selectively extracting a first optical signal, having a wavelength selected in response to a signal designating a particular wavelength, from said optical wavelength multiplex signals, and second means for converting a circuit signal to be transmitted into a second optical signal by use of a wavelength different from the wavelengths included in said received optical wavelength multiplex signals and transmitting said second optical signal after wavelength-multiplexing thereof with said received optical wavelength multiplex signals; and
at least one but less than N wavelength converting devices.

6. An optical wavelength multiplexing network according to claim 5, wherein said wavelength converting device is connected to a plurality of said optical wavelength multiplexing add/drop apparatuses by said optical fiber means.

7. An optical wavelength multiplexing network according to claim 6, wherein said N optical wavelength multiplexing add/drop apparatuses are connected by said optical fiber means to form at least one ring together with said wavelength converting device.

8. An optical wavelength multiplexing network according to claim 7, wherein said wavelength converting device selects an optical signal to be relayed and converts the optical signal into the wavelength extracted at one of the add/drop apparatuses.

9. An optical wavelength multiplexing network including plural network node apparatuses which are connected to each other by optical fibers, comprising:
N optical wavelength multiplexing add/drop apparatuses where N is a positive integer not smaller than 2, each of which includes first means for selectively extracting a first optical signal, having a wavelength selected in response to a signal designating a particular wavelength, from the optical signal split from a received optical wavelength multiplex signals, and second means for converting a circuit signal to be transmitted into a second optical signal by use of a wavelength different from the wavelengths included in said received optical wavelength multiplex signals and transmitting said second optical signal after wavelength-multiplexing thereof with said received optical wavelength multiplex signals; and
at least one but less than N optical wavelength multiplexing cross-connection devices.

10. An optical wavelength multiplexing network according to claim 9, wherein said optical wavelength multiplexing cross-connection device is connected to a plurality of said optical wavelength multiplexing add/drop apparatuses by said optical fiber means.

11. An optical wavelength multiplexing network according to claim 10, wherein said N optical wavelength multiplexing add/drop apparatuses are connected by said optical fiber means to form at least one ring together with said optical wavelength multiplexing cross-connection device.

12. An optical wavelength multiplexing network according to claim 11, wherein said optical wavelength multiplexing cross-connection device converts optical wavelength multiplex signals inputted from a plurality of input ports into optical signals of any wavelength and connects the optical signals to any transmission port.

13. An optical wavelength multiplexing network according to claim 12, wherein said optical wavelength multiplexing cross-connection device is a wavelength-division multi-stage switch circuit network having cascade-connected wavelength converting switches each converting a wavelength in an optical N-wavelength multiplex signal (N: a positive integer not smaller than 2) into any wavelength and includes optical couplers for making cascade connection between said wavelength converting switches.

14. An optical wavelength multiplexing network including plural network node apparatuses which are connected to each other by optical fibers, comprising:
N optical wavelength multiplexing add/drop apparatuses where N is a positive integer not smaller than 2, each of which includes first means for selectively extracting a first optical signal, having a wavelength selected in response to a signal designating a particular wavelength, from received optical wavelength multiplex signals, and second means for converting a circuit signal to be transmitted into a second optical signal by use of a wavelength different from the wavelengths included in said received optical wavelength multiplex signals and transmitting said second optical signal after wavelength-multiplexing thereof with said received optical wavelength multiplex signals; and at least one but less than N optical wavelength multiplexing cross-connection devices;

wherein said optical wavelength multiplexing cross-connection device is connected to a plurality of said optical wavelength multiplexing add/drop apparatuses by said optical fiber means;

wherein said N optical wavelength multiplexing add/drop apparatuses are connected by said optical fibers to form at least one ring together with said optical wavelength multiplexing cross-connection device;

wherein said optical wavelength multiplexing cross-connection device converts optical wavelength multiplex signals inputted from a plurality of input ports into optical signals of any wavelength and connects the optical signals to any transmission port;

wherein said optical wavelength multiplexing cross-connection device comprises:

an optical wavelength converting switch group in a first stage composed of N optical wavelength converting switches each of which includes means for branching an optical N-wavelength multiplex signal into N parts, and means for selecting ones from among the N wavelengths multiplexed in each of the branch signals from said branching means with one wavelength being selected for each branch signal and converting the selected wavelengths into different specified wavelengths;

an optical wavelength converting switch group in each of second to L-th stages (L: a positive integer not smaller than 2) composed of N optical wavelength converting switches each of which includes an optical coupler for receiving N output signals of different wavelengths from the N optical wavelength converting switches in the preceding stage with one output being selected for each optical wavelength converting switch and branching the sum of the received signals into N parts, and means for selecting ones from among the N wavelengths multiplexed in each of the branch signals from said optical coupler with one wavelength being selected for each branch signal and converting the selected wavelengths into different specified wavelengths; and N means each of which wavelength-multiplexes N outputs of different wavelengths from one of tie optical wavelength converting switches in the L-th stage and outputs the wavelength multiplex signal.

15. An optical, wavelength multiplexing, add/drop apparatus for separating a data signal from a received signal and forming a transmission signal, comprising:

means for selectively extracting said data signal, having a wavelength signal selected in response to a signal designating a particular wavelength, from said received signal; means for converting a circuit signal into an optical circuit signal which wavelength differs form said data signal; means for combining the remainder of said received signal with said optical circuit signal to form said transmission signal.

* * * * *

UNITED STATES PATENT AND TRADEMARK OFFICE
CERTIFICATE OF CORRECTION

PATENT NO. : 5/438,445
DATED : August 1, 1995
INVENTOR(S) : Yukio Nakano

It is certified that error appears in the above-identified patent and that said Letters Patent is hereby corrected as shown below:

On the Title Page, left-hand column, after "[22] Filed: Oct. 29, 1991" insert item:

-- [30] Foreign Application Priority Data
    October 29, 1990 [JP] Japan ..............02-288526 --.

Signed and Sealed this

Sixteenth Day of July, 1996

Attest:

BRUCE LEHMAN

Attesting Officer      Commissioner of Patents and Trademarks